(12) United States Patent
Lee

(10) Patent No.: US 6,952,227 B2
(45) Date of Patent: Oct. 4, 2005

(54) CMOS IMAGE SENSOR FOR PROVIDING WIDER DYNAMIC RANGE

(75) Inventor: Do-Young Lee, Ichon-shi (KR)

(73) Assignee: Magnachip Semiconductor, Ltd., Cheongju (KR)

(*) Notice: Subject to any disclaimer, the term of this patent is extended or adjusted under 35 U.S.C. 154(b) by 774 days.

(21) Appl. No.: 09/749,572

(22) Filed: Dec. 28, 2000

(65) Prior Publication Data

US 2001/0005224 A1 Jun. 28, 2001

(30) Foreign Application Priority Data

Dec. 28, 1999 (KR) .......................................... 1999-63879

(51) Int. Cl.[7] .......................... H04N 3/14; H04N 5/335
(52) U.S. Cl. ..................... 348/308; 348/310; 250/208.1
(58) Field of Search ....................... 250/208.1; 348/294, 348/300–304, 307–310

(56) References Cited

U.S. PATENT DOCUMENTS

| | | | | |
|---|---|---|---|---|
| 5,572,074 A | * | 11/1996 | Standley ........................ 307/117 |
| 5,742,047 A | * | 4/1998 | Buhler et al. ................ 250/214 R |
| 5,898,168 A | | 4/1999 | Gowda et al. | |
| 6,111,245 A | * | 8/2000 | Wu et al. ..................... 250/208.1 |
| 6,130,423 A | * | 10/2000 | Brehmer et al. ........... 250/208.1 |
| 6,242,728 B1 | * | 6/2001 | Merrill et al. .............. 250/208.1 |
| 6,297,492 B1 | * | 10/2001 | Clark ............................ 250/214 R |
| 6,556,244 B1 | * | 4/2003 | So et al. ........................... 348/296 |
| 6,670,990 B1 | * | 12/2003 | Kochi et al. .................... 348/310 |

FOREIGN PATENT DOCUMENTS

| | | |
|---|---|---|
| EP | 0 938 229 A2 | 8/1999 |
| JP | 01-196165 | 8/1989 |

* cited by examiner

Primary Examiner—Ngoc-Yen Vu
Assistant Examiner—Carramah J. Quiett
(74) Attorney, Agent, or Firm—Pillsbury Winthrop, LLP

(57) ABSTRACT

A CMOS image sensor for providing a wider dynamic range even at a low power supply voltage level includes a plurality of unit pixels and a control unit. Each unit pixel includes: a light sensing element for sensing an incident light to generate photoelectric charges to a sensing node; a first switching unit, coupled between a power terminal and the sensing node, for transferring a reset voltage level from a voltage source to the light sensing element; an amplification unit for amplifying a voltage level of the sensing node to output an amplified signal, wherein one terminal of the amplification unit is coupled to a ground terminal; a second switching unit, coupled between an output node and the other terminal of the amplification unit, for outputting the amplified signal as an image data via the output node. The control unit, which is coupled between the power terminal and the output node, controls an output resistance of the output node.

10 Claims, 2 Drawing Sheets

CMOS IMAGE SENSOR FOR PROVIDING WIDER DYNAMIC RANGE

FIELD OF THE INVENTION

The present invention relates to a semiconductor device; and, more particularly, to a CMOS image sensor for providing a wider dynamic range at a low power supply voltage level, thereby obtaining a high image quality.

DESCRIPTION OF THE PRIOR ART

As is well known, an image sensor is an apparatus for sensing a light beam reflected from an object to generate an image data. Especially, an image sensor fabricated by using a complementary metal oxide semiconductor (CMOS) technology is called a CMOS image sensor.

Generally, the CMOS image sensor includes a plurality of unit pixels. Each of the unit pixels also includes a light sensing element and a plurality of transistors. The light sensing element such as a photodiode senses incident light beam to generate photoelectric charges corresponding to an amount of the incident light beam. The transistors perform switching operations to control a transfer of the photoelectric charges.

At this time, in order for obtaining a high image quality, a large power supply voltage level is required. In general, the CMOS image sensor uses a power supply voltage of about 5 V. However, as a degree of integration in the CMOS image sensor becomes increasingly higher, the power supply voltage level applied to the CMOS image sensor is also being lower.

FIG. 1 is a circuit diagram showing a conventional CMOS image sensor.

Referring to FIG. 1, the conventional CMOS image sensor includes a unit pixel 10, and the unit pixel 10 includes a photodiode 12 and four transistors. Four transistors also include a transfer transistor MT, a reset transistor MR, a drive transistor MD and a select transistor MS. Further, the CMOS image sensor includes a load transistor ML coupled to the unit pixel 10.

The photodiode 12 senses an incident light to generate photoelectric charges. The transfer transistor MT, coupled between the photodiode 12 and a sensing node NS, transfers the photoelectric charges to the sensing node NS. The reset transistor MR, coupled between a power terminal VDD and the sensing node NS, transfers a reset voltage level from a voltage source to the photodiode 12 and the drive transistor MD.

The drive transistor MD, whose drain is coupled to the power terminal VDD, amplifies a voltage level of the sensing node NS to output an amplified signal. The select transistor MS, coupled between the drive transistor MD and an output node NO, performs a switching operation to output the amplified signal as an image data via the output node NO.

The load transistor ML, coupled between the output node NO and a ground terminal GND, controls a current that flows via the output node NO of the unit pixel 10.

At this time, the conventional unit pixel 10 has a dynamic range of about 1.5 V under the power supply voltage level of 5 V. If the power supply voltage level is decreased, the photoelectric charges accumulated in the photodiode 12 is also reduced and a dynamic range of the CMOS image sensor becomes narrower, thereby degrading an image quality. Therefore, there is a demand on a unit pixel capable of providing a wider dynamic range even at a low power supply voltage level.

SUMMARY OF THE INVENTION

It is, therefore, an object of the present invention to provide a CMOS image sensor for providing a wider dynamic range at a low power supply voltage level to thereby obtain a high image quality.

In accordance with an embodiment of the present invention, there is provided a CMOS image sensor, comprising: a light sensing means for sensing an incident light to generate photoelectric charges to a sensing node; a first switching means, coupled between a power terminal and the sensing node, for transferring a reset voltage level from a voltage source to the light sensing means; an amplification means for amplifying a voltage level of the sensing node to output an amplified signal, wherein one terminal of the amplification means is coupled to a ground terminal; a second switching means, coupled between an output node and the other terminal of the amplification means, for outputting the amplified signal as an image data via the output node; and a control means, coupled between the power terminal and the output node, for controlling an output resistance of the output node.

BRIEF DESCRIPTION OF THE DRAWINGS

Other objects and aspects of the invention will become apparent from the following description of the embodiments with reference to the accompanying drawings, in which.

DETAILED DESCRIPTION OF THE PREFERRED EMBODIMENTS

Figure 1:
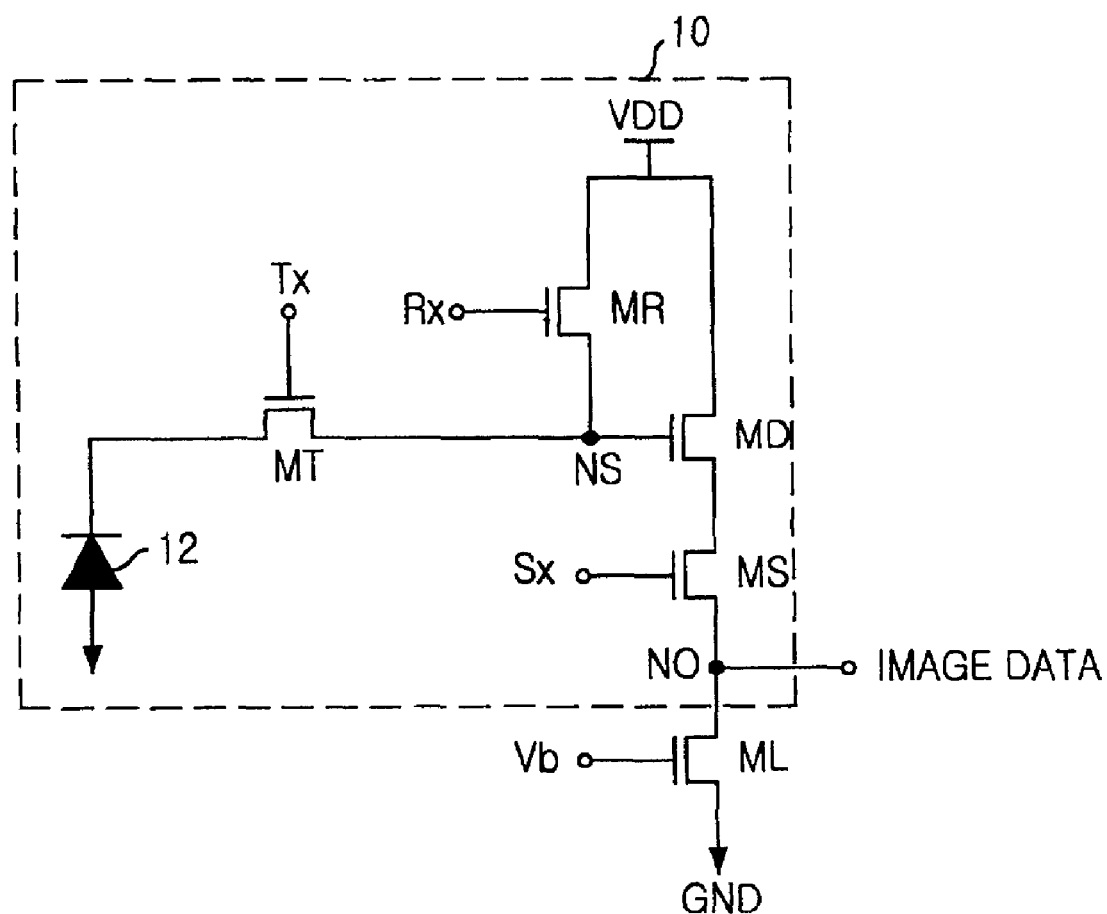
FIG. 1 is a circuit diagram showing a conventional CMOS image sensor.
Figure 2:
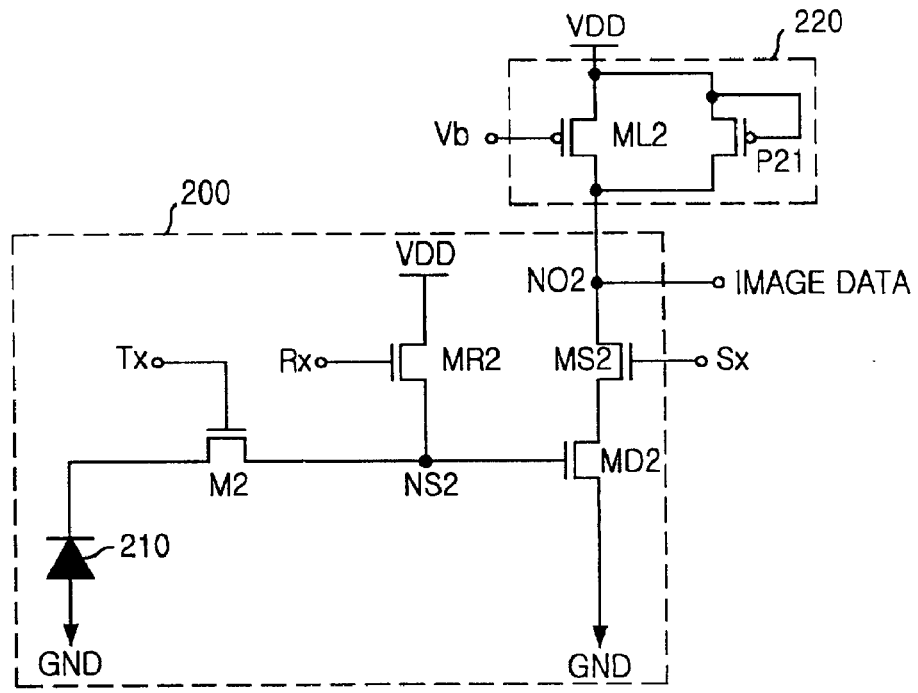
FIG. 2 is a circuit diagram illustrating a CMOS image sensor in accordance with an embodiment of the present invention.

FIG. 2 is a circuit diagram illustrating a CMOS image sensor in accordance with an embodiment of the present invention.

Referring to FIG. 2, the CMOS image sensor in accordance with an embodiment of the present invention includes a unit pixel 200 and a control unit 220. The unit pixel 200 also includes a photodiode 210 as a light sensing element and four NMOS transistors as switching elements. Four NMOS transistors also include a transfer transistor MT2, a reset transistor MR2, a drive transistor MD2 and a select transistor MS2.

The photodiode 210 senses an incident light to generate photoelectric charges. The transfer transistor MT2, coupled between the photodiode 210 and a sensing node NS2, transfers the photoelectric charges to the sensing node NS2. The reset transistor MR2, coupled between a power terminal VDD and the sensing node NS2, transfers a reset voltage level from a voltage source to the photodiode 210 and the drive transistor MD2.

The drive transistor MD2, whose source is coupled to a ground terminal GND, amplifies a voltage level of the sensing node NS2 to output an amplified signal. The select transistor MS2, coupled between an output node NO2 and a drain of the drive transistor MD2, performs a switching operation to output the amplified signal as an image data via the output node NO2.

The control unit 220 includes a PMOS transistor P20 coupled between the power terminal VDD and the output node NO2. The PMOS transistor P20 is responsive to a bias voltage Vb. Preferably, the control unit 220 further includes a diode-connected PMOS transistor P21, coupled in parallel to the PMOS transistor P20. The diode-connected PMOS transistor P21 controls an output resistance of the output node NO2 to thereby minimize a current that flows via the output node NO2.

Figure 3:
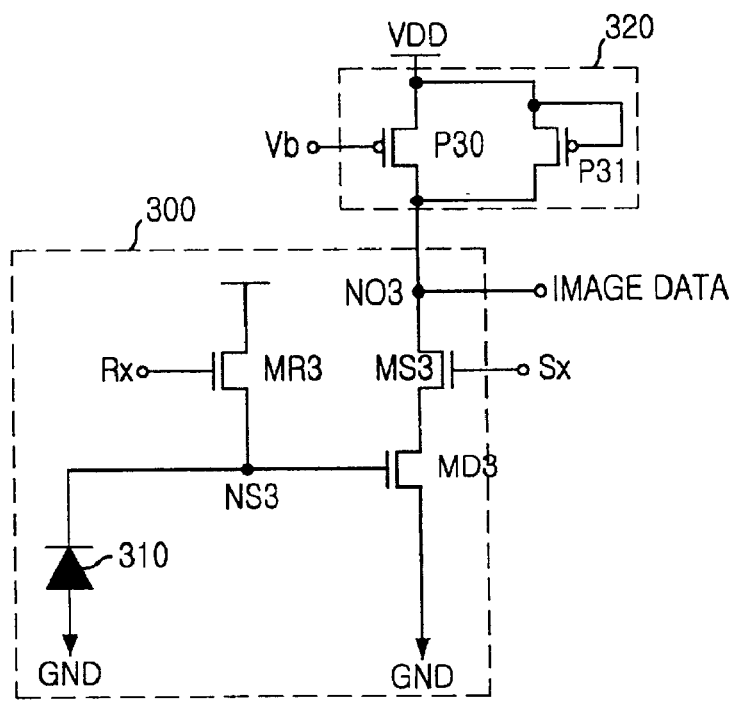
FIG. 3 is a circuit diagram illustrating a CMOS image sensor in accordance with another embodiment of the present invention.

FIG. 3 is a circuit diagram illustrating a CMOS image sensor in accordance with another embodiment of the present invention.

Referring to FIG. 3, the unit pixel in accordance with another embodiment of the present invention includes a wilt pixel 300 and a control unit 320. Compared with the unit pixel 200 shown in FIG. 2, only difference is that the imir pixel 300 includes three NMOS transistors,i.e., a reset transistor MR3, a drive transistor MD3 and a select transistor MS3.

At this time, the drive transistor MD contained in the conventional unit pixel 10 performs a signal transfer function rather than a signal amplification function. Meanwhile, the drive transistors MD2 and MD3 contained In the CMOS image sensor in accordance with the present invention 20 performs a signal amplification function as well as a signal transfer function, thereby obtaining a wider dynamic range. Additionally, since the control units 220 and 320 respectively control the output resistances of the output nodes N02 and N03, the CMOS image sensor can stably operate.

Although the preferred embodiments of the invention have been disclosed for illustrative purposes, those skilled in the art will appreciate that various modifications, additions and substitutions are possible, without departing from the scope and spirit of the invention as disclosed in the accompanying claims.

What is claimed is:

1. A CMOS image sensor, comprising: a light sensing means for sensing an incident light to generate photoelectric charges to a sensing node;

a first switching means, coupled between a power terminal and the sensing node, for transferring a reset voltage level from a voltage source to the light sensing means;

an amplification means for amplification a voltage level of the sensing node to output an amplified signal, wherein one terminal of the amplification means is coupled to a ground terminal;

a second switching means, coupled between an output node and the other terminal of the amplification means, for outputting the amplified signal as an image data via the output node; and a control means, coupled between the power terminal and the output node, for controlling an output resistance of the output node, wherein the control means includes a MOS transistor coupled between the power terminal and the output node and a diode-connected MOS transistor coupled in parallel to the MOS transistor.

2. The CMOS image sensor as recited in claim 1, wherein the light sensing means is a photodiode.

3. The CMOS image sensor as recited in claim 2, wherein the first switching means and the second switching means are NMOS transistors.

4. The CMOS image sensor as recited in claim 3, wherein the amplification means is an NMOS transistor.

5. The CMOS image sensor as recited in claim 1, further comprising a third switching means, coupled between the light sensing means and the sensing node, for transferring the photoelectric charges to the sensing node.

6. The CMOS image sensor as recited in claim 5, wherein the third switching means is an NMOS transistor.

7. The CMOS image sensor as recited in claim 6, wherein the light sensing means is a photodiode.

8. The CMOS image sensor as recited in claim 7, wherein the first and the second means are NMOS transistors.

9. The CMOS image sensor as recited in claim 8, wherein the amplification means is an NMOS transistor.

10. The CMOS image sensor as recited in claim 1, wherein the MOS transistor and the diode-connected MOS transistor are PMOS transistors.

* * * * *